United States Patent [19]
Suzuki

[11] 4,380,367
[45] Apr. 19, 1983

[54] COATING MATERIAL FOR OPTICAL COMMUNICATION GLASS FIBERS

[75] Inventor: Toshio Suzuki, Ichihara, Japan

[73] Assignee: Toray Silicone Co., Ltd., Tokyo, Japan

[21] Appl. No.: 212,712

[22] PCT Filed: Mar. 28, 1980

[86] PCT No.: PCT/JP80/00050
§ 371 Date: Nov. 3, 1980
§ 102(e) Date: Nov. 3, 1980

[87] PCT Pub. No.: WO80/02078
PCT Pub. Date: Oct. 2, 1980

[30] Foreign Application Priority Data
Mar. 28, 1979 [JP] Japan .................. 54-37259

[51] Int. Cl.$^3$ .................................. G02B 5/14
[52] U.S. Cl. ..................... 350/96.34; 350/96.29; 250/227; 528/31; 106/287.14; 524/861
[58] Field of Search ............. 350/96.1, 96.23, 96.29, 350/96.3, 96.31, 96.32, 96.33, 96.34; 250/227; 260/37 B; 427/163, 167; 428/375, 378

[56] References Cited
U.S. PATENT DOCUMENTS
3,948,848 4/1976 Mink .................. 260/37 SB
4,114,981 9/1978 Ishida et al. ................ 350/96.33

FOREIGN PATENT DOCUMENTS
51-100734 1/1976 Japan .
52-47667 4/1977 Japan .
52-63961 5/1977 Japan .
52-150050 12/1977 Japan .

*Primary Examiner*—Marvin L. Nussbaum
*Attorney, Agent, or Firm*—Scully, Scott, Murphy & Presser

[57] ABSTRACT

Provided is a coating material for optical communication glass fibers comprising a vinyl group terminated methylphenylpolysiloxane, a methylhydrogenpolysiloxane or a methylphenylhydrogenpolysiloxane, and a platinum catalyst. This coating material is superior in coating work efficiency onto optical communication glass fibers, cures quickly and can afford an optical communication glass fiber of high quality having a closely adhered cured film rich in flexibility and uniformity.

6 Claims, No Drawings

COATING MATERIAL FOR OPTICAL COMMUNICATION GLASS FIBERS

FIELD OF ART

This invention relates to a coating material for optical communication glass fibers and more particularly to a silicone type coating material for optical communication glass fibers.

BACKGROUND TECHNIQUE

Optical communication glass fibers are made from glass such as quartz glass and are extremely small in diameter, for which reason they are weak in strength. In order to make up such weakness in strength of optical communication glass fibers and to avoid strain on their surfaces, generally a primary coat is applied onto the surface of those fibers using, for example, nylon, polyethylene, polyurethane, epoxy resin, or silicone resin.

As shown on page 12 of Japanese Patent Laying Open Print No. 100734/76, it is preferable that such primary coat materials have a higher refractive index than that of the clad layer of optical communication glass fibers.

Among those materials, moreover, silicone resin having a higher refractive index than that of the clad layer is considered to be the most preferred material for improving the characteristics of optical communication glass fibers, as is described in Japanese Patent Laying Open Print No. 150050/77.

However, the silicone resin which has heretofore been used in this kind of application is disadvantageous in that the cured film is very hard, that the air bubbles incorporated before or during the coating operation are difficult to be removed, that the components of the composition are less compatible with each other resulting in the curing being slowed down, and that the coated film surface becomes rough.

It is an object of this invention to remedy such disadvantages associated with conventional primary coat materials.

It is another object of this invention to provide a coating material for optical communication glass fibers, characteristic in that the incorporated air bubbles are easy to be removed, that it can be applied easily onto an optical communication glass fiber having a clad layer, that it can be cured quickly, that the adhesion thereof to such glass fiber is satisfactory, and that it can form a smooth film rich in flexibility.

It is a further object of this invention to provide an optical communication glass fiber coated with a coating material having the above-mentioned characteristics.

DISCLOSURE OF THE INVENTION

The aforesaid objects of this invention can be attained by a coating material for optical communication glass fibers and an optical communication glass fiber having a primary coat layer formed by applying the said coating material onto the glass fiber followed by curing said coating material for optical communication glass fibers comprising the following components (a), (b) and (c):

(a) a vinyl group terminated methylphenylpolysiloxane having a viscosity at 25° C. of 100 to 15,000 cP and with a methyl/phenyl molar ratio in the range of 1/1 to 10/1, the amount of the component (a) being 100 parts by weight, (b) at least one organohydrogenpolysiloxane selected from the group consisting of a methylhydrogenpolysiloxane having a viscosity at 25° C. of 0.7 to 5,000 cP and containing at least three silicon atom bonded hydrogen atoms in one molecule, and a methylphenylhydrogenpolysiloxane having a viscosity at 25° C. of 0.7 to 5,000 cP, containing at least three silicon atom bonded hydrogen atoms in one molecule and with a methyl/phenyl molar ratio not smaller than 1/1, the amount of the component (b) being an amount required to provide a molar ratio of the silicon atom bonded hydrogen atoms in the component (b) to the silicon atom bonded vinyl groups in the component (a) of 0.8/1 to 10/1, and (c) platinum or a platinum compound, the amount of the component (c) as platinum metal being 0.5 to 1,000 ppm of the total amount of both components (a) and (b).

BEST FORM FOR PRACTISING THE INVENTION

This invention is described below more concretely.

The foregoing component (a) in the coating material for optical communication glass fibers of this invention, which is a main component of the coating material of the invention, is cross-linked by the component (b) under the catalytic action of the component (c) to form a flexible elastomer. The main chain of the component (a) is polysiloxane with methyl group alone or both methyl and phenyl groups present in the side chain, and usually and preferably it is straight-chained, but may be somewhat branched. By way of illustrating such polysiloxane, mention may be made of a homopolymer consisting of methylphenylsiloxane units alone, a copolymer of dimethylsiloxane units and methylphenylsiloxane units, and a copolymer of dimethylsiloxane units and diphenylsiloxane units.

At the ends of such polysiloxane are sure to be present vinyl group. In addition to vinyl groups, methyl group alone, phenyl group alone, or both methyl and phenyl groups are present at the ends. The component (a) is cross-linked with such end vinyl groups alone, and in this point there is significance. The molar ratio of silicon atom bonded methyl group to silicon atom bonded phenyl group should be within the range of 1/1 to 10/1. A smaller ratio than 1/1 would tend to impede curing, and a larger ratio than 10/1 would result in that the air bubbles incorporated at time of mixing with the components (b) and (c) become difficult to be removed.

The clad layer in conventional optical communication glass fibers has a refractive index in the range of 1.45 to 1.46, so in order to obtain a higher refractive index exceeding the said range it is preferable that the methyl/phenyl molar ratio be in the range of 1/1 to 7/1.

The viscosity of such polysiloxane should be in the range of 100 to 15,000 cP at 25° C. If its viscosity is lower than 100 cP, the resulting coated film is hard and the viscosity at time of mixing with the components (b) and (c) becomes low so the film thickness becomes too small. On the other hand, its viscosity exceeding 15,000 cP would result in the coated film being too soft and the mixture with the components (b) and (c) being too viscous so the coating work efficiency decreases. The range of 500 to 10,000 cP is particularly preferred.

The component (b) is a cross-linking agent for the component (a); that is, the silicon atom bonded hydrogen atoms in the component (b) add the silicon atom bonded vinyl groups in the component (a) to allow the component (a) to be cross-linked to form an elastomer. In point of molecular structure the component (b) may assume any of straight-chained, branched, cyclic and network structures. To illustrate the methylhydrogenpolysiloxane in the component (b), mention may be made of trimethylsilyl group terminated methylhydrogenpolysiloxane, trimethylsilyl group terminated dimethylsiloxane/methylhydrogensiloxane copolymer, dimethylhydrogensilyl group terminated methylhydrogenpolysiloxane, dimethylhydrogensilyl group terminated dimethylsiloxane/methylhydrogensiloxane copolymer, tetramethyltetrahydrogencyclotetrasiloxane, pentamethyltrihydrogencyclotetrasiloxane, and tris(dimethylhydrogensiloxy)methylsilane. To exemplify the methylphenylhydrogenpolysiloxane in the component (b), mention may be made of trimethylsilyl group terminated methylhydrogensiloxane/methylphenylsiloxane copolymer, trimethylsilyl group terminated methylhydrogensiloxane/dimethylsiloxane/methylphenylsiloxane copolymer, trimethylsilyl group terminated methylhydrogensiloxane/dimethylsiloxane/diphenylsiloxane copolymer, dimethylhydrogensilyl group terminated methylhydrogensiloxane/methylphenylsiloxane copoymer, dimethylhydrogensilyl group terminated dimethylsiloxane/methylhydrogensiloxane/methylphenylsiloxane copolymer, dimethylhydrogensilyl group terminated dimethylsiloxane/methylhydrogensiloxane/diphenylsiloxane copolymer, tetramethyltrihydrogenphenylcyclotetrasiloxane, pentamethyltrihydrog endiphenylcyclopentasiloxane, trimethyltrihydrogendiphenylcyclotetrasiloxane, and phenyltris(dimethylhydrogensiloxy)silane.

The viscosity of the component (b) should be in the range of 0.7 to 5,000 cP. A lower viscosity than 0.7 would liable to cause volatilization at time of heat curing, and if the viscosity exceeds 5,000 cP the coating work efficiency decreases.

In the component (b) there may be present at least three and preferably not more than thirty silicon atom bonded hydrogen atoms in one molecule. A too large number thereof would result in the cured film becoming hard.

The component (b) is blended with the component (a) in an amount such that the molar ratio of the silicon atom bonded hydrogen atoms in the component (b) to the silicon atom bonded vinyl groups in the component (a) is in the range of 0.8/1 to 10/1. If this ratio is smaller than 0.8/1, the curing will be insufficient, and if it exceeds 10/1, the resulting coated film becomes too hard.

In the case of using a methylphenylhydrogenpolysiloxane as the component (b), it is necessary that the methyl/phenyl molar ratio should be not smaller than 1/1, that is, phenyl groups should be present in equal amount or less with respect to methyl groups. Such a methylphenylhydrogenpolysiloxane is highly compatible with the component (a), quick in curing and superior in working efficiency.

In order to utilize more effectively the aforesaid characteristics of a methylphenylhydrogenpolysiloxane, it is preferable that the above-mentioned ratio be in the range of 1/1 to 100/1, more preferably it be about the same molar ratio as the methyl/phenyl molar ratio of the component (a).

In the case of using a methylhydrogenpolysiloxane as the component (b), as compared with the use of a methylphenylhydrogenpolysiloxane, it is somewhat inferior in compatibility, but is characteristic in that the incorporated air bubbles are easy to be removed and that it can be applied onto optical communication glass fibers more quickly and uniformly.

The component (c) is a catalyst to be used in the addition reaction of the components (a) and (b) allowing cross-linking to take place to form an elastomer. As platinum or platinum compound as the component (c) are exemplified a finely powdered platinum, an adsorbed one thereof on a carrier, platinum black, chloroplatinic acid, sodium chloroplatinate, potassium chloroplatinate, platinum tetrachloride, an alcohol modified chloroplatinic acid, a complex of chloroplatinic acid and olefin, a complex of chloroplatinic acid and alkenylsiloxane, and a diketone chelate compound of platinum.

The compound (c) is used in an amount ranging from 0.5 to 1,000 ppm in terms of the amount of platinum based on the total amount of the components (a) and (b). If the amount of the component (c) is smaller than 0.5 ppm in terms of the amount of platinum, the curing speed becomes low, and if its amount exceeds 1,000 ppm, the pot life at time of mixing with the components (a) and (b) becomes too short and such a large amount is uneconomical. A preferred range is from 1 to 200 ppm.

The coating material of this invention can be produced easily by mixing together the three components (a), (b) and (c). For the mixing there may be used any suitable mixing machine which usually is in use for the mixing of liquid substances. Once these three components are mixed together, curing begins to take place and proceeds evan at room temperature, so with a view to lengthening the pot life it is preferable to add a very small amount of an inhibitor such as triallylisocyanurate, triazoles, nitryl compounds, or acetylenic compounds.

There may be further added as necessary a reinforcing filler such as a fumed silica or sedimentation process silica with or without a trimethylsilylated surface, an extending filler such as a finely powdered quartz or diatom earth, a heat-resisting agent, a flame retardance improver, a pigment, or an organic solvent.

Application of the coating material of this invention to an optical communication glass fiber may be carried out by a known method such as the dipping method in which the fiber is dipped in the coating material, or the spray method in which the coating material is sprayed over the fiber. The curing treatment for the coated film is performed by heat treatment usually at a temperature of 200° to 900° C. for a period of 0.1 to several ten seconds. Both core-clad type and core-clad-jacket type optical communication glass fibers may be treated according to this invention.

The coating material of this invention is characteristic in that the air bubbles incorporated at time of mixing the components thereof can be removed easily, that it is easy to perform the coating operation onto an optical communication glass fiber, that the coating material cures quickly and that it can afford a cured film closely adhered to the glass fiber, rich in flexibility and free from bubbles.

Working examples of this invention are given below to further illustrate the invention, in which the expression "part(s)" represents "part(s) by weight" and the expression "%" represents "% by weight," and in which the viscosity values are at 25° C.

EXAMPLE 1

100 parts of a vinyl group terminated methylphenylpolysiloxane (consisting of dimethylsiloxane units and methylphenylsiloxane units, the methyl/phenyl molar ratio being 2.5/1) having a viscosity of 7,000 cP, 4 parts of a trimethylsilyl group terminated dimethylsiloxane/-methylhydrogensiloxane copolymer (dimethylsiloxane units 10, methylhydrogensiloxane units 4) having a viscosity of 5 cP and 0.2 part of an isopropyl alcohol solution containing 1% chloroplatinic acid were thoroughly mixed together and then held at 2 mmHg for 5 minutes whereby the air bubbles incorporated at time of mixing could be removed completely. Into the resulting mixture was dipped a quartz glass fiber for optical communication 150μ in diameter (core-clad type having a core diameter of 60μ) in the form of a single line, then immediately drawn up and kept perpendicular in hot air at 330° C. for 2 seconds, resulting in that the coated layer changed into an elastomer having a film thickness of about 40μ. The elastomer was colorless and transparent, having a refractive index of 1.49, and it adhered to the glass fiber closely and uniformly free from bubbles.

EXAMPLE 2

100 parts of a vinyl group terminated methylphenylpolysiloxane (consisting of dimethylsiloxane units and methylphenylsiloxane units, the methyl/phenyl molar ratio being 4/1) having a viscosity of 3,000 cP, 2 parts of tetramethyltetrahydrogen cyclotetrasiloxane having a viscosity of 2 cP and 0.5 part of an octyl alcohol solution containing 0.5% chloroplatinic acid were thoroughly mixed together and then held at 2 mmHg for 5 minutes whereby the air bubbles incorporated at time of mixing could be removed completely. Into the resulting mixture was dipped a quartz glass fiber for optical communication 125μ in diameter (core-clad type having a core diameter of 50μ) in the form of a single line, then immediately drawn up and kept perpendicular in hot air at 300° C. for 3 seconds, resulting in that the coated layer changed into an elastomer having a film thickness of about 32μ. The elastomer was colorless and transparent, having a refractive index of 1.48, and it adhered to the glass fiber closely and uniformly free from bubbles.

EXAMPLE 3

100 parts of a dimethylvinyl group terminated methylphenylpolysiloxane (consisting of dimethylsiloxane units and methylphenylsiloxane units, the methyl/phenyl molar ratio being 2.3/1) having a viscosity of 4,000 cP, 5 parts of siloxane having a viscosity of 12 cP represented by the formula

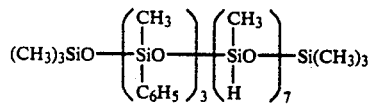

and 0.3 part of a 2-ethylhexanol solution containing 1% chloroplatinic acid were thoroughly mixed together and then held under a reduced pressure of 1 mmHg for 5 minutes whereby the air bubbles incorporated at time of mixing could be removed completely. Into the resulting mixture was dipped as a single line a core-clad type quartz glass fiber for optical communication having a diameter of 125μ and a core diameter of 50μ, then immediately drawn up and kept perpendicular in hot air at 450° C. for 1.5 seconds, resulting in that the coated layer changed into an elastomer having a film thickness of about 25μ.

The elastomer was colorless and transparent, having a refractive index of 1.50, and it adhered to the glass fiber closely and uniformly free from bubbles.

EXAMPLE 4

100 parts of a methylphenylvinyl group terminated methylphenylpolysiloxane (consisting of dimethylsiloxane units and diphenyl units, the methyl/phenyl molar ratio being 1.5/1) having a viscosity of 6,000 cP, 3 parts of phenyltris(dimethylhydrogensiloxy)silane having a viscosity of 3 cP and 0.2 parts of a 2-ethylhexanol solution containing 1% chloroplatinic acid were thoroughly mixed together and then held under a reduced pressure of 1 mmHg for 5 minutes whereby the air bubbles incorporated at time of mixing could be removed completely. Into the resulting mixture was dipped as a single line a core-clad type quartz glass fiber for optical communication having a diameter of 125μ and a core diameter of 50μ, then immediately drawn up and kept perpendicular in hot air at 400° C. for 2 seconds, resulting in that the coated layer changed into an elastomer having a film thickness of about 35μ. The elastomer was colorless and transparent, having a refractive index of 1.53, and it adhered to the glass fiber closely and uniformly free from bubbles.

INDUSTRIAL UTILIZABILITY

As set forth hereinbefore, the coating material of this invention is superior in coating work efficiency onto optical communication glass fibers and can afford a cured film of high quality; therefore, optical communication glass fibers coated with the coating material of this invention are useful as a strand of optical fiber cables for long and short distance communication and also as a strand of general industrial optical fiber cables.

I claim:

1. A coating material for optical communication glass fibers, comprising the following components (a), (b) and (c):
    (a) a vinyl group terminated methylphenylpolysiloxane having a viscosity at 25° C. of 100 to 15,000 cP and with a methyl/phenyl molar ratio in the range of 1/1 to 10/1, the amount of the component (a) being 100 parts by weight,
    (b) at least one organohydrogenpolysiloxane selected from the group consisting of a methylhydrogenpolysiloxane having a viscosity at 25° C. of 0.7 to 5,000 cP and containing at least three silicon atom bonded hydrogen atoms in one molecule, and a methylphenylhydrogenpolysiloxane having a viscosity at 25° C. of 0.7 to 5,000 cP, containing at least three silicon atom bonded hydrogen atoms in one molecule and with a methyl/phenyl molar ratio not smaller than 1/1, the amount of the component (b) being an amount by weight required to provide a molar ratio of the silicon atom bonded hydrogen atoms in the component (b) to the silicon atom bonded vinyl groups in the component (a) of 0.8/1 to 10/1, and
    (c) platinum or a platinum compound, the amount by weight of the component (c) being 0.5 to 1,000 ppm in terms of platinum metal based on the total amount of the components (a) and (b).

2. The coating material for optical communication glass fibers as defined in claim 1, in which said organohydrogenpolysiloxane of the component (b) is a methylhydrogenpolysiloxane having a viscosity at 25° C. of 0.7 to 5,000 cP and containing at least three silicon atom bonded hydrogen atoms in one molecule.

3. The coating material for optical communication glass fibers as defined in claim 1, in which said organohydrogenpolysiloxane of the component (b) is a methylphenylhydrogenpolysiloxane having a viscosity at 25° C. of 0.7 to 5,000 cP, containing at least three silicon atom bonded hydrogen atoms in one molecule and with a methyl/phenyl ratio in the range of 1/1 to 100/1.

4. The coating material for optical communication glass fibers as defined in claim 1, 2 or 3, in which the methyl/phenyl molar ratio in the vinyl group terminated methylphenylpolysiloxane of the component (a) and the methyl/phenyl molar ratio in the methylphenylhydrogenpolysiloxane of the component (b) are of about and equal value.

5. The coating material for optical communication glass fibers as defined in claim 1, 2 or 3, in which said vinyl group terminated methylphenylpolysiloxane of the component (a) has a viscosity at 25° C. of 500 to 10,000 cP and a methyl/phenyl molar ratio in the range of 1/1 to 7/1, said organohydrogenpolysiloxane contains 3 to 30 silicon atom bonded hydrogen atoms per molecule, and said platinum or platinum compound of the component (c) being used in an amount of 1 to 200 ppm in terms of platinum metal based on the total amount of the components (a) and (b).

6. An optical communication glass fiber having a primary coat layer formed by applying a composition onto said glass fiber followed by curing, said composition comprising:

(a) a vinyl group terminated methylphenylpolysiloxane having a viscosity at 25° C. of 100 to 15,000 cP and with a methyl/phenyl molar ratio in the range of 1/1 to 10/1, the amount of the component (a) being 100 parts by weight, (b) at least one organohydrogenpolysiloxane selected from a methylhydrogenpolysiloxane having a viscosity at 25° C. of 0.7 to 5,000 cP and containing at least three silicon atom bonded hydrogen atoms in one molecule, and a methylphenylhydrogenpolysiloxane having a viscosity at 25° C. of 0.7 to 5,000 cP, containing at least three silicon atom bonded hydrogen atoms in one molecule and with a methyl/phenyl molar ratio not smaller than 1/1, the amount of the component (b) being an amount by weight required to provide a molar ratio of the silicon atom bonded hydrogen atoms in the component (b) to the silicon atom bonded vinyl groups in the component (a) of 0.8/1 to 10/1, and (c) platinum or a platinum compound, the amount by weight of the component (c) being 0.5 to 1,000 ppm in terms of platinum metal based on the total amount of the components (a) and (b).

* * * * *